United States Patent Office 3,501,423
Patented Mar. 17, 1970

3,501,423
LIQUID VULCANIZABLE RUBBER
COMPOSITION OF MATTER
David P. Tate, Northfield, and Edward L. Carr, Akron, Ohio, assignors to The Firestone Tire & Rubber Company, Akron, Ohio, a corporation of Ohio
No Drawing. Filed Mar. 29, 1966, Ser. No. 538,196
Int. Cl. C08c 11/22; C08d 13/00; C08f 47/12
U.S. Cl. 260—8    19 Claims

ABSTRACT OF THE DISCLOSURE

The invention relates to a flowable composition consisting of rubber particles in a liquid soluble in the rubber, the rubber and liquid being separated by an encapsulating barrier. The rubber may comprise curing, reinforcing and/or extending agents. The liquid may be naphthenic, paraffinic and/or aromatic hydrocarbons. The barrier material ceases to be a barrier at elevated temperature. It may be gelatin, gelatin-gum arabic film, an alkylene oxide polymer polyvinyl alcohol or an esterification derivative thereof, self-micellized particles, a hydrophilic polymer or a polymer one portion of which is lyophilic toward the liquid and the other is lyophobic toward the liquid.

---

This invention relates to a flowable multi-phase composition containing a vulcanizable rubber, its preparation and use. The composition comprises particles of a solid phase containing the rubber, said particles being dispersed in a liquid solvent for the rubber. The liquid solvent can be a plasticizer for the rubber. The solvent can be relatively non-volatile or relatively volatile. A preferred embodiment is a dispersion of particles containing a sulfur-vulcanizable natural or synthetic rubber.

In such composition, the rubber is substantially uncured. Compounding ingredients, if used, can be in either phase of the composition, or a part in each. A part of the compounding ingredients can constitute one or more other phases. The rubber is dispersed in the liquid solvent in a form which resists migration of the solvent into it. Then steps are taken to cause the solvent to migrate into the rubber to form a single, substantially homogeneous, solvent-extended, liquid or solid phase. The rubber can then be cured, with added curing ingredients if desired.

The ordinary or common rubber plasticizers, when mixed with a dispersion of rubber particles in the amount commonly used for rubber extension, dissolve very rapidly in the rubber at room temperature to form a highly viscous, essentially solid mass. As contrasted with this, an embodiment of this invention is a fluid system of rubber particles maintained in the plasticizer by constructing a closely conforming barrier around each rubber particle to prevent the migration of plasticizer into the rubber until it is desired to convert the mixture to a single homogeneous phase. This fluid system may be a paste, more or less thick, or it may be relatively free flowing. The barrier is then destroyed or otherwise rendered ineffective by any one of several different procedures, some of which will be described, and the plasticizer migrates into the rubber particles.

THE PRIOR ART

It has long been a desire of the industry to have an elastomeric material that can be very conveniently molded. The conventional high-performance elastomers, when compounded, are extremely viscous materials that require very high molding or clamping pressures for even simple shapes; and complex shapes are very difficult to fabricate. The industry, recognizing the need for a less viscous composition, has developed certain castable rubbers that are easily pourable, such as the silicon, polyurethane, epoxy and polyester rubber. However, these rubbers lack the physical characteristics necessary for many products such as tires and high-performance industrial products. The present invention provides for the use of fluid compositions of high molecular weight rubbers which are suitable for the above-named purposes.

Plastisols

The invention can be conveniently conceptualized by relating it to the vinyl plastisol art. It is well known in this field that polyvinylchloride particles are immiscible in certain plasticizers at room temperature; and compositions of 100 parts polyvinylchloride in 50 parts of plasticizer (for example tricresyl phosphate) form a relatively low viscosity, pourable two-phase dispersion of the vinyl particles in plasticizer. Such flowable liquids remain stable indefinitely at room temperature. However, on heating, the plasticizer migrates into the polyvinyl chloride particles and fusion into a substantially firm mass occurs. If this conversion is carried out in a mold, the mass takes the form of the mold. This property of vinyl plastisols is an extremely valuable one not only because it provides a simple and inexpensive process, but also because it allows the manufacture of articles having intricate shapes that could otherwise not be made. It has been impossible to handle rubber in a similar manner because the available plasticizers migrate into the rubber even at room temperature.

A purpose of this invention is to provide a means to prevent plasticizer from prematurely migrating into a rubber, and thus achieve the desirable fabrication advantages with rubber that are inherently possible with vinyl plastisols.

THE INVENTION

The invention can be carried out with natural rubber and with synthetic rubbers. The rubber is utilized in subdivided form. It may be obtained by subdividing a bulk of rubber such as natural smoked sheets, or by utilizing a latex, or by starting with a powdered rubber, or by spray drying a solution or colloidal dispersion of polymer.

With respect to the rubbers that must be compounded, the compounding ingredients are usually at least in part incorporated in the rubber before it is subdivided for use in the invention. Some of the compounding ingredients may be present in the plasticizer. Compounding ingredients may be milled into the rubber, or in the case of synthetic rubbers compounding ingredients may be incorporated in the synthetic polymer by solution compounding, latex compounds, or mastication in a Banbury mixer or the like. An extending oil may be included in the composition. Means well known in the art may be employed. The rubber is utilized in subdivided form.

The plasticizer is a liquid. It is usually used in an amount which on migration into the rubber will give a good solid rubber product, although sufficient plasticizer may be used to produce a cement. Thus, one can use 15 to 200 parts of plasticizer, or preferably 25 to 150 parts, per 100 parts of the rubber. Although usually the amount of plasticizer is that ultimately desired, and it can be less. Any usual curing or other compounding ingredients may be employed, in conventional amounts, depending upon the use which is to be made of the rubber. The rubber can be vulcanized by sulfur or non-elemental sulfur cures (as with selenium or tellurium compounds and the like) or organic curing agents of the sulfur-donor type which cross link without free sulfur being present. The latter include, for example, the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyldithiocarbamates, the thiuram sulfides, the xanthogen sulfides, metallic salts of mercaptothiazoles or mercaptothiazolines or dithiocarbamic acids. One or more accelerator activator can be used with any of the accelerators of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Although vulcanization is usually accomplished by heating a vulcanizable rubber composition at a temperature in the range of 240 to 400° F. for a time ranging from several hours to a few seconds, vulcanization of a suitably activated rubber composition does take place at lower temperatures such as at room temperature.

Any suitable amount of the accelerator will be used, depending upon the rubber and the use to which the rubber is to be put, as is well known in the rubber art.

THE BARRIER TO PLASTICIZER MIGRATION

With the rubber in subdivided form, any suitable means is utilized to provide a temporary barrier to oil migration or plasticizer migration. Several processes for accomplishing this are listed here.

(a) *Spray drying.*—This procedure converts an aqueous dispersion of particles of compounded, uncured rubber into dry particles coated with the barrier. A water-soluble or water-dispersible film-forming protective colloid is employed to maintain the rubber particles in a state of colloidal dispersion. On spray drying such a dispersion the compounded rubber is obtained in the form of fine particles coated with the film-forming material. Oher surface-active agents which may also have been employed in the aqueous dispersion for purposes of stabilization are present on the surface of the dry particles. Among materials which can be used to coat rubber particles in this way are gelatin, gum arabic, starch, carboxylated starch, dextrin, polyvinyl alcohol, polyvinylpyrrolidone, methyl cellulose, hydroxyethyl cellulose, carboxymethyl cellulose, polyethylene oxide, poly(vinylmethyl ether), polyacrylamide, styrene-maleic anhydride copolymer, methylvinylether-maleic anhydride copolymer, block copolymers containing both hydrocarbon blocks and polyalkylene oxide blocks such as co(polybutadiene-block-polyethylene oxide) and also derivatives of such materials which have greater surface activtiy than the parent materials including polysoaps of the anionic and cationic types. The co(polybutadiene-block-polyethylene oxide) film-forming polymers are analogous to, and are higher molecular weight variations of, the well-known surface-active polyethylene oxide stearates. A polyethylene-oxide-stearate surface-active agent (e.g. Myrj 53) employed to stabilize the colloidal dispersion of compounded rubber particles is adsorbed on the particles surface, through affinity of the hydrocarbon tail for the rubber particle, and affinity of the hydrophilic block for the water, and remains on the particle surface after spray drying. The hydrophilic blocks are on the periphery of the dry particles. In similar manner a film-forming block copolymer containing blocks of polybutadiene and of polyethylene oxide, when employed as the surface-active agent in conjunction with rubber particles is adsorbed on the rubber particles and oriented so as to form a film of polyethylene oxide on the particle surface. Furthermore, the block copolymer, apart from any other rubber particles, when elastomeric micellizes to form colloidal particles (micelles) with the hydrophilic polyethylene oxide chains on the surface of the particles, in which case such self micellization spontaneously produces the colloidal rubber particle with a hydrophilic film on the surface and integrated therewith. Whether the block copolymer be used as the sole polymer or whether it be used as the barrier film on a rubber particle, the film of high molecular weight polyethylene oxide constitutes the barrier and enables the particle to behave as a rubber particle in the manner herein described.

There are at least two methods well known to the art for producing suitable block copolymers. They are:

(1) Grafting blocks on polymer molecules: For example, grafting polyethylene oxide, poly(acrylate ester) or other blocks of hydrophilic nature on a preformed polybutadiene or other essentially hydrocarbon polymer.

(2) Block copolymerization: For example, forming a copolymer by polymerization of butadiene initiated by a catalyst which may be a lithium-based catalyst or Ziegler-type catalyst or other catalyst, and subsequently exposing the live polymer to ethylene oxide or other monomer capable of being polymerized as a block.

In general the film-forming materials employed in the above process, and which become the barrier on the particles, are lyophobic at ordinary temperature toward the plasticizer in which the rubber particles are dispersed. They have little or no solubility in the plasticizer dispersant, with no more than limited swelling therein, at a low temperature, but increasing solubility at a higher temperature. At the elevated temperaure of incorporation of the liquid dispersant into the rubber, the barrier material becomes less lyophobic and may even become lyophilic toward the liquid dispersant. A lyophobic material is one which has little or no affinity for the liquid medium in which the particles are dispersed, while a lyophilic material has affinity for the liquid medium.

Most of the materials listed above are hydrophilic in the sense that they have affinity for water. However, most of the materials listed are surface active which means that they contain also hydrophobic groups in their molecular composition, and these hydrophobic groups have affinity for the rubber hydrocarbon portion of the particles. The general behavior of block copolymers in the formation of colloidal particles is described in a review article by Robert M. Fitch in Official Digest, Journal of Paint Technology and Engineering (published by the Federation of Societies for Paint Technology, 121 South Broad Street, Philadelphia, Pennsylvania), March 1965, pages 243–258.

Among the lyophobic materials which may be used as a barrier for coating rubber particles are certain waxes (petroleum, animal or vegetable), which may be applied to the particles in either the spray drying process or by condensing the vapor on to the particles, e.g., in a vacuum.

The mention of polysoaps above refers to a new class of surface active agents having interesting properties. A polysoap molecule contains lyophilic and lyophobic groups in proper balance so that a solution thereof tends to form micelles. The polysoaps dissolve in a solvent and form micelles, and the polysoap molecules are strongly adsorbed onto the surfaces of particles of another material present in the system. The polysoaps are good colloid stabilizers. They are uniquely suited for use in the present invention. The invention can be realized by simply dissolving a polysoap in a solvent, dispersing a rubbery polymer therein and then spray drying the dispersion to obtain particles of the rubbery polymer coated with a barrier layer of the polysoap. Such coated particles are easily dispersed in a liquid solvent for the rubber to provide the flowable dispersion of the invention. An example without limitation of a suitable cationic polysoap is the quaternary ammonium salt of polyvinylpyridine and dodecyl bromide or dodecyl chloride. Examples without limitation of appropriate anionic polysoap are a polystyrene sulfonate, produced by sulfonation of polystyrene, and the sodium salt of a copolymer of maleic anhydride with n-octadecyl vinyl ether.

The polysoaps are anionic and cationic examples of the broader class of surface active polymers useful in the invention. The non-ionic polymeric surface active agents mentioned above, for example without limitation the block copolymers of polybutadiene and polyethylene oxide, also belong to the class of surface-active polymers.

The following processes are discussed in some detail in "Micro Encapsulation," a study prepared by graduate students at the Harvard Graduate School of Business Administration, and published by Management Reports, 38 Cummington Street, Boston, Massachusetts 02215 (1963).

(b) *Simple coacervation* [1].—This process uses gelatin or other gellable hydrophilic colloid such as, for example, albumin, alginates, casein, agar-agar, starch, pectins, carboxymethylcellulose, Irish moss and gum arabic. One method is described in Green U.S. Patent 2,800,458 as applied to the encapsulation of oil droplets. Rubber particles can be encapsulated in a similar manner. They will be recovered from the aqueous latex phase and dispersed in the plasticizer.

(c) *Complex coacervation.*—This process utilizes two different gellable, hydrophilic colloid materials and is described in Green et al. U.S. Patent 2,800,457 as applied to the encapsulation of oil droplets. Rubber particles can be substituted for the oil droplets, otherwise employing the same technique as disclosed therein, including the spray-drying or other recovery of such particles.

(d) *Interfacial polymerization.*—A film is formed at the interface between the rubber particles and a non-solvent dispersing medium which can be, for example, water or alcohol. Brynko U.S. Patent 2,969,330 is illustrative of such a process.

(e) *Meltable dispersion process.*—Molten barrier material is added to a dispersion of rubber particles, preferably while dispersed in an aqueous medium, and by cooling the barrier material encapsulates on the particles.

(f) *Vacuum encapsulation.*—The process involves condensation on dry suspended rubber particles of a vapor which forms a barrier to plasticizer migration. The coated particles are then dispersed in the plasticizer.

(g) *The Wurster process.*—The process, applicable to encapsulating rubber particles, is described in U.S. Patents 2,648,609 and 2,799,241. The particles are dispersed in plasticizer.

The barrier can retard migration of the plasticizer into the rubber for only the short length of time required for utilization of the composition within the plant where it is prepared, but it can be longer as in the case of a commercial composition adapted to be stored indefinitely and sold for use in other plants or locations. The purpose of the barrier is to retard the migration of plasticizer into the rubber. The length of time that the plasticizer must be kept away from the rubber and the temperature range in which this is effective depends upon the application envisioned. This can be varied by altering the nature and proportion of the barrier material. A flowable material can be produced suitable for storing for long periods of time and then capable of being converted to a solid essentially homogeneous material. On the other hand, the barrier can be designed so that the oil or other plasticizer starts to migrate noticeably within a shorter time as, for example, a period of one-half hour after mixing the rubber with it.

EFFECTING THE PLASTICIZER MIGRATION BY APPLICATION OF ENERGY

Various methods are available for destroying the effectiveness of the barrier, so that the plasticizer can migrate into the rubber. The method used must be one that is accommodated to the particular nature of the barrier and to the intended use of the composition. Energy is applied in the form of thermal energy (conductive, dielectric, infrared or other radiant energy), or mechanical energy (e.g. sonic or ultrasonic), or other effecting means. On the other hand, if the situation is such that migration of the plasticizer into the rubber must be accomplished under ambient conditions, the barrier is designed to give controlled delay so that no added energy input is required. Thus the flowability of the dispersion of the rubber particles can be but a few minutes or can be prolonged indefinitely.

The compositions can be fabricated into useful products by a number of procedures which avoid the high molding or calendering pressures required in conventional rubber processing. They can be used in casting, dipping, knife-coating, spraying or slush molding, as in the manufacture of coated fabrics, wires and mechanical goods as well as in the manufacture of tires, belts, foams, inner tubes and pre-cured tire treads.

RUBBERY POLYMERS

The invention relates to the known natural and synthetic rubbers. The largest group of rubbers is the sulfur-vulcanizable rubbers, which contain some ethylenic unsaturation, including without limitation Hevea rubber and other known natural rubbers, reclaimed natural rubbers, the known homopolymers of butadiene, isoprene, piperylene, dimethylbutadiene, chloroprene, fluoroprene and other conjugated diolefins and substituted derivatives thereof; the known copolymers of any of the preceding diolefin monomers with each other and/or with monovinyl monomers copolymerizable therewith, including without limitation butadiene-styrene copolymers (including GR-S and SBR), isoprene-styrene copolymers, butadiene-acrylonitrile copolymers (NBR), isobutylene-isoprene copolymers (IIR or butyl rubber), the various neoprenes, butadiene-acrylate copolymers and terpolymers (including ADR), ethylene-propylene-unconjugated diolefin terpolymers (EPT or EPDM rubbers), chlorinated butyl rubber, brominated butyl rubber, reclaimed synthetic rubbers, reclaimed mixtures of natural and synthetic rubbers, reclaimed butyl rubber, reclaimed neoprenes, reclaimed GR-S, and other known rubbery homopolymers, copolymers, terpolymers or quaternary polymers of one or more conjugated diolefin or substitution derivative with any one or more of the known vinyl monomers copolymerizable therewith.

Other synthetic rubbers suitable for use in the invention include without limitation chlorosulfonated polyethylene (for example, "Hypalon"), the polyalkylene polysulfide rubbers (for example, the "Thiokol" rubbers), rubbery polyisobutylene, hydrogenated polybutadiene, hydrogenated polyisoprene, atactic polypropylene, ethylene-propylene rubbers (EPR), and rubbery copolymers of ethylene with higher homologs of propylene. The polysulfide rubbers and the chlorosulfonated polyethylene rubbers mentioned above can be vulcanized by techniques well known in the rubber art. The saturated or substantially saturated hydrocarbon rubbers mentioned can be vulcanized by treatment with any of the known organic peroxides or hydroperoxides available for this purpose, an example without limitation being cumene peroxide (for example, "Dicup"). The saturated, as well as the unsaturated, rubbers mentioned above can also be vulcanized by exposure to high energy radiation, for example without limitation gamma rays, X-rays and high energy electron beams.

The various known rubbers mentioned above are well known to be extremely viscous materials when dispersed in a plasticizer so that they cannot be poured, as can the castable rubbers such as silicones and polyurethanes. Such rubbers have molecular weights of upwards of 50,000. These elastomers, when plasticized with the amounts of the plasticizer usually used in the art, are not flowable. However, by providing a barrier around the rubber particles, as contemplated herein, flowable mixtures are obtained which contain the normal amount of plasticizer.

---
[1] "Colloid Science," H. R. Kruyt, ed., vol. II, chap. VIII, p. 244, Elsevier, Amsterdam, 1949.

It is possible to disperse the rubber particles in less plasticizer than will eventually be required, and dilute this with other plasticizer and/or with a volatile solvent.

A mixture or blend of two or more rubbery polymers can be used in the invention is lieu of any single polymer.

In addition to the conventional rubbers, the invention is applicable to elastomers which are synthesized to include a temporary barrier to plasticizer migration, as discussed above.

The particle size of the rubber can vary. It will generally by within the range of 0.1 to 100 microns, and preferably 1 to 10 microns.

LIQUID SOLVENTS

The continuous phase of a dispersion of the invention is a liquid solvent for the rubber particles dispersed therein. The liquid can be a plasticizer for the polymer or it can be a volatile solvent or a mixture of one or more plasticizers with or without added volatile solvent. Solvents and plasticizers suitable for the various thermoplastic resins, thermosetting resins, sulfur-vulcanizable rubbers and other rubbers usable in the invention are well known in the rubber and plastics arts. The term "liquid" is used broadly to mean a non-gaseous, flowable substance which can be more or less viscous but is substantially less viscous than the rubber composition of the particles dispersed in the liquid.

PLASTICIZERS

The plasticizers used include those commonly employed for rubber extension and processing, including the petroleum-based oils designated in the industry as paraffinic (e.g. "Flexon" 875), naphthenic (e.g. "Circosol" 380 and "Flexon" 643), aromatic (e.g. "Sundex" 8180 and "Flexon" 391), and highly aromatic oils (e.g. "Sundex" 8125), esters (such as dioctyl phthalate and diisodecyl phthalate), liquid polybutadienes, polybutene and other polyolefin oils and various petroleum-based resins. Such plasticizers migrate into the rubbers at ambient temperatures, but by encapsulation or otherwise conditioning the particles as taught herein, the rate of migration of plasticizer is retarded and controlled to satisfy the requirements of processing into end products.

USES

The flowable composition of this invention can be utilized for coating fabrics with rubber by means of very simple, convenient equipment, rather than the expensive calenders conventionally employed; and for molding as, for example, by injection molding, transfer molding, centrifugal casting and other known molding techniques. Such molded articles may or may not comprise a core. They include, for example, tire treads, whole tires, belts and boots. The equipment and/or processes used can vary greatly and can be modifications of such widely different types as suggested by the following U.S. Patents: 2,207,426; 2,309,729; 2,354,424; 2,629,134; 2,814,834; 2,860,379; 2,888,714; 3,040,384; 3,095,260; 3,130,452; 3,153,815; 3,173,175; 3,173,176.

The processes are particularly adaptable to the production of articles of relatively large cross section or thick wall structure which cannot be produced from a latex or rubber solution.

The following examples are illustrative. All parts are by weight unless otherwise specified.

EXAMPLE 1

This illustrates the application of a surface film to particles of compounded rubber by spray drying, and formulation of a flowable two-phase mixture by dispersing the spray-dried particles in a dispersant liquid.

A hexane solution of polybutadiene containing about 15 percent polybutadiene is solution-compounded by mixing therewith, with agitation, the following compounding ingredients:

| | |
|---|---:|
| Polybutadiene | 100 |
| Carbon Black [1] | 68 |
| Zinc oxide | 2 |
| Stearic acid | 2 |
| Antioxidant | 1.5 |
| Sulfur | 2 |
| Accelerator | 1.5 |
| Total | 177 |

[1] Intermediate super abrasion furnace black.

The fluid mixture is adjusted to 20 percent total solids by evaporating any excess hexane which may have been added as a carrier for some of the pigments.

A quantity of the above compounded rubber cement is emulsified in 10 percent aqueous polyvinyl alcohol (Elvanol 50–42 which is composed essentially of polyvinyl alcohol and esterified derivatives), using sufficient of the latter to supply 1 part polyvinyl alcohol to 3 parts compounded rubber (i.e. polybutadiene plus pigments). An Eppenbach Homo-mixer or equivalent high-shear unit is used to effect emulsification of the compounded rubber cement and produce small particles of substantially 1–30 microns in diameter. The polyvinyl alcohol serves as a colloid stabilizer for the particle system and subsequently as barrier around the spray-dried particles. Hexane is evaporated from the system under agitation leaving a system of particles of compounded rubber. Some water is removed along with the hexane, but is replaced to give a final total solids content of 20–25 percent.

The hexane-free aqueous dispersion of compounded rubber is spray dried to obtain fine particles of compounded rubber coated with polyvinyl alcohol, the ratio of the weights of the compounded rubber to the coating being about 75:25. The particles obtained in this way are mixed with a rubber extending oil of the paraffinic type in the proportions of about 60 parts oil to 100 parts particles to form a fluid rubber paste. The mix remains fluid at room temperature. A portion was caused to flow into a mold cavity which was then closed and subjected to a temperature of 290° F. in a hydraulic press for 60 minutes. The originally fluid rubber composite was converted into a solid, firm vulcanizate.

The product of Example 1 can be varied to give a range of values of the ratio of polyvinyl alcohol to compounded rubber, thereby varying the resistance of the encapsulated particles to oils and plasticizers used as the liquid component of the two-phase rubber composition. For instance, the thickness of the coating can be reduced so that the ratio of the compounded rubber to the coating is 97:3. The pot life of the fluid rubber composition is thus varied over a wide range of time.

The product can also be varied with respect to the polymeric film forming material employed to impart a coating to the particles. Water-soluble or water-dispersible materials which can be used are gelatin, gum arabic, copolymer of styrene and maleic anhydride (e.g. Lytron), copolymers of methylvinyl ether and maleic anhydride (e.g. Gantrez), methylcellulose, hydroxyethyl cellulose, polyvinylpyrrolidone, dextrin, carboxylated dextrin, block copolymers containing hydrocarbon polymeric blocks and polyether blocks such as polyethylene oxide, block copolymers of different alkylene oxides, acrylic acid polymers and copolymers, and many other materials.

The formula for vulcanizing the rubber can be varied as desirable.

A further variation of the product can be made with respect to the nature and amount of the liquid dispersant in which the microencapsulated (barriered) particles are suspended. The liquid dispersant can be used in amounts ranging from about 25 parts to 150 parts per 100 parts of particles. The dispersant liquid can be any of the conventional rubber extending oils or mixtures of these, with or without added amounts of other liquids to increase or decrease viscosity or otherwise adjust the characteristics of the fluid rubber.

Plasticizers of the ester type (mono- and poly-ester), polyglycols, ethers and formals can be used. It is usually desirable to suit the dispersant liquid to the materials of the surface film of the particles, or vice versa, so as to realize satisfactory duration of resistance of the particle to diffusion into it of the liquid dispersant.

EXAMPLE 2

A hexane solution of polybutadiene containing about 15 percent polybutadiene is solution-compounded by admixing therewith, with agitation, the same compounding ingredients as used in Example 1, or other suitable vulcanizing ingredients. The liquid mixture is adjusted to 20 percent total solids by evaporating excess hexane added as a carrier for some of the pigments.

A quantity of the above compounded rubber cement is emulsified in 10 percent aqueous gelatin (Atlantic superclarified gelatin Type A, low bloom) using sufficient of the latter solution to supply 1 part of gelatin to 2 parts of compounded rubber (i.e. polybutadiene plus pigments). An Eppenbach homo-mixer is used to effect emulsification of the liquid compounded cement. The gelatin serves initially as stabilizer for the colloid system, and subsequently as the barrier around the rubber particles.

Hexane is evaporated from the system under agitation as in a disc concentrator of the type used to increase the total solids of latex. Some water is removed along with the hexane, but is replaced continuously or at intervals to maintain the total solids at 20–25 percent (compounded rubber plus gelatin).

Microencapsulation of the rubber particles is effected as follows: The hexane-free dispersion of compounded rubber particles in gelatin solution which results, is brought to 50° C. and subjected to the gelatin separation on to the rubber particles, coacervation being effected by slow addition of about 460 cc. of 20 percent aqueous sodium sulfate to about 1150 grams of this dispersion of compounded rubber particles in gelatin solution at 50° C., with continuous agitation. The gelatin is hardened around the rubber particles at lowered temperature by pouring the mixture with agitation into about 2.2 quarts of 7 percent sodium sulfate solution at 0°–10° C., and maintaining the temperature at this value. The microencapsulated particles are washed by allowing them to settle in the aqueous system held at 0°–10° C., decanting the supernatant aqueous phase, adding more cold water (0°–10° C.) and dispersing the particles. This sequence can be repeated several times. The final dispersion of gelatin-coated rubber particles can be spray dried to isolate them. Or they can be treated with formaldehyde to harden the capsule around each particle, after which the particles can be recovered by filtration or spray-drying. Any method of coacervation previously mentioned herein may be adapted to deposition of film around rubber particles and any method of recovering the coacervate-coated particles can be employed instead of that more particularly described in this example.

The dry microencapsulated compounded rubber particles are mixed with a plasticizer such as a rubber-extending oil to form a fluid mixture which can be used in operations of casting, coating and impregnating followed by heating to form vulcanized rubber products.

EXAMPLE 3

A dispersion of compounded rubber particles in aqueous gum arabic is prepared by the method of Example 1, using gum arabic as the colloid stabilizer in place of polyvinyl alcohol. The concentration of total solids is about 20 percent, the concentration of compounded rubber particles being about 16 percent, the concentration of gum arabic in the system being about 4 percent, and the weight ratio of gum arabic to compounded rubber being approximately 1 to 4.

Microencapsulation of the compounded rubber particles is effected by a coacervation process involving addition of a second component, gelatin, to the gum arabic system. This so-called complex coacervation process is described in some detail in "Colloid Science" referred to above, pages 255–258. Using 1155 g. of the above described dispersion of compounded rubber particles in aqueous gum arabic at 50° C., with pH of 7 to 7.5, there is added thereto 924 grams of an aqueous solution at 50° C. containing 5 percent gelatin (Atlantic Type A, low bloom, isoelectric point 7 to 8.3), adjusted to pH 7 to 7.5. Water in the amount of 1500 to 2000 grams is stirred into the batch, the resultant mix being at 50° C. The first stage of coacervation is effected by adjusting the pH to 4.5 at 50° C. with agitation. Formaldehyde is added in the amount of 16 grams of formalin (37 percent aqueous solution). The batch is then rapidly cooled to 0° C. to 10° C. to gel the capsule wall, and the pH is again adjusted, but upward to 9–10 to complete the hardening reaction of formaldehyde.

The microencapsulated compounded rubber particles can be isolated by spray-drying the aqueous dispersion of about 20 percent concentration obtained by allowing the particles to settle and decanting a part of the aqueous phase, or by centrifuging and decanting, or by filtering and re-dispersing the particles to about 20 percent concentration for spray-drying.

The encapsulated particles can also be isolated by filtering cold (0°–10° C.), drying the mass and comminuting to particles.

The product consisting of microencapsulated compounded rubber particles is mixed with a plasticizer such as an extending oil or other suitable plasticizer to form the two-phase liquid composition of this invention, which can be used to form rubber products.

EXAMPLE 4

A dispersion of particles of compounded polybutadiene rubber in aqueous gum arabic is prepared by the method of Example 1. The total solids content is about 20 percent, the compounded rubber amounting to two-thirds of the total solids and the gum arabic constituting the remainder of the total solids.

Under inert conditions obtained by nitrogen blanketing, styrene and divinylbenzene are added to a quantity of the rubber dispersion in the amount of 9 parts styrene and 1 part divinylbenzene per 100 parts rubber. The batch is agitated at 30° C. over night to effect absorption of styrene and divinylbenzene into the rubber particles. Potassium persulfate is added in the amount of 0.5 part for each 10 parts of monomer (styrene plus divinylbenzene) and the batch is heated with agitation at 50° C. over night to complete polymerization. Cross-linked styrene-divinylbenzene copolymer forms at the interface of the rubber particles and aqueous phase, imparting to the particles resistance to oils and other plasticizers. The particles are isolated by spray drying, or sedimentation, or filtration.

The particles can be mixed with a rubber extending oil or plasticizer to form the product of this invention.

In this example various emulsifiers can be used in place of gum arabic; for example, gelatin, polyvinyl alcohol, soaps such as oleates or stearates, synthetic emulsifiers such as sodium lauryl sulfate and sodium dodecylbenzene sulfonate and the like. Other monomers can be used in place of styrene and divinylbenzene, such as acrylates and methacrylates together with a difunctional cross-linking monomer. Other free-radical initiators can be used in place of potassium persulfate; for example, benzoyl peroxide, alpha, alpha-zero-di-isobutyronitrile, and the like.

After interfacial polymerization the particles can be subjected to further micro-encapsulation by processes suggested by Examples 1 and 2, employing a batch of proper composition for this purpose. In this way the initial oil barrier synthesized at the surface of the particles is augmented or modified by superimposing on it a barrier of film forming material.

The particles are then mixed with plasticizer and compounding ingredients for the rubber to form a two-phase fluid product. This product is used for coating, molding, casting, impregnating and other procedures and is then treated to destroy the effectiveness of the barrier films and heated to cause vulcanization of the rubber.

We claim:

1. A multi-phase, flowable, vulcanizable rubber composition of essentially solid particles comprising a vulcanizable rubber composition dispersed in a liquid of the class consisting of rubber solvents and plasticizers, said composition being vulcanizable at a given temperature and there being a filmed coating around the rubber particles which is lyophobic toward the liquid and inhibits merging of the liquid and particles at room temperature, and at elevated temperatures loses its ability to inhibit incorporation of the liquid into the particles.

2. The composition of claim 1 in which the liquid is an extending oil of the class consisting of naphthenic, paraffinic and aromatic hydrocarbon liquids.

3. The composition of claim 1 which includes a compounding ingredient of the class consisting of reinforcing and extending agents dispersed in one of the phases.

4. The composition of claim 1 in which the particles are enclosed in a closely conforming film of a barrier material.

5. The composition of claim 1 in which the barrier material is essentially a gelatin-gum arabic film.

6. The composition of claim 1 in which the barrier material is essentially a film of polyvinyl alcohol.

7. The composition of claim 1 in which the barrier material is essentially a gelatin film.

8. The composition of claim 1 in which the particles are self-micellized particles.

9. The composition of claim 1 in which the barrier material is an integral part of at least a portion of the rubber molecules in the particles.

10. The composition of claim 1 in which the barrier is selected from the group consisting of anionic and cationic polysoaps, a portion of which barrier is lyophilic in character toward the liquid, and another portion is lyophobic in character toward the liquid.

11. The composition of claim 1 in which the particles contain carbon black.

12. The composition of claim 1 in which the rubber of the particles is hydrocarbon and the barrier material is hydrophilic.

13. The composition of claim 12 in which the barrier is essentially gelatin.

14. The composition of claim 12 in which the barrier is essentially an alkylene oxide polymer.

15. The process of treating rubber contained in a flowable composition of sulfur-compounded, uncured rubber particles dispersed in a plasticizer which is separated from the rubber by a heat-modifiable filmed barrier which is insoluble in the plasticizer at a lower temperature and soluble therein at vulcanizable temperature, which process comprises flowing the composition to its final position at such lower temperature and heating it to said vulcanization temperature to vulcanize the rubber composition and overcome the effect of the barrier and thus causing the plasticizer to become incorporated into the rubber, the rubber with the plasticizer incorporated therein being a solid.

16. The composition of claim 1 wherein the particles consist essentially of conjugated-diene polymer and the filmed coating comprises cross-linked styrene-divinylbenzene copolymer.

17. In the process of vulcanizing a rubber composition vulcanizable at a given temperature, the steps comprising
(a) flowing in a mold a composition which comprises a dispersion of rubber particles individually coated with a filmed coating of a film-forming substance having both lyophilic and lyophobic characteristics toward the rubber particles, the lyophilic part of said coating being adjacent to the particles, in a plasticizer for the rubber particles, and
(b) destroying the coating by heating the dispersion to vulcanization temperature in the mold and thereby curing the rubber composition.

18. The process of claim 17 in which the film-forming substance is volatile and vapor of the film-forming substance is condensed on individual particles.

19. The process of claim 17 in which the film-forming substance is selected from the group consisting of anionic and cationic polysoaps.

References Cited

UNITED STATES PATENTS

| 2,433,656 | 12/1947 | Eagan et al. | 260—8 |
| 3,167,602 | 1/1965 | Bentov et al. | 264—4 |
| 3,214,402 | 10/1965 | Göbel | 260—34.2 |

FOREIGN PATENTS

| 901,167 | 7/1962 | Great Britain. |
| 930,421 | 7/1963 | Great Britain. |

OTHER REFERENCES

Chemical Engineering, Dec. 4, 1967, p. 176, "Microencapsulation Processes," Table II.

Materials Research & Standards, Vol. 3, 1963, p. 656, "Tiny Capsules Separate Adhesive and Solvent" (TA 401 M58).

The NCR Factory News, October 1959, "NCR Capsules Have Wide Possibilities."

WILLIAM H. SHORT, Primary Examiner

E. WOODBERRY, Assistant Examiner

U.S. Cl. X.R.

252—316; 260—9, 31.8, 33.6, 34.2, 740, 742, 747, 749, 751, 836, 879

PO-1050
(5/69)

UNITED STATES PATENT OFFICE
CERTIFICATE OF CORRECTION

Patent No. 3,501,423          Dated March 17, 1970

Inventor(s) David P. Tate and Edward L. Carr

It is certified that error appears in the above-identified patent and that said Letters Patent are hereby corrected as shown below:

Col. 3, lines 15-16 should read:

--tor activator can be used with anynof the accelerators mentioned, and such activators include the various derivatives of guanidine known in the rubber art, amine salts of--

Col. 5, line 45 should read:

--2,648,609 and 2,799,241. The particles are then dispersed in--

Col. 6, line 37, "ADR" should read --ABR--

Col. 7, line 5 should read:

--can be used in the invention in lieu of any single polymer.--

Col. 10, line 72 should read:

--benzoyl peroxide, alpha, alpha-azo-di-isobutyronitrile,--

SIGNED AND
SEALED
SEP 22 1970

(SEAL)
Attest:

Edward M. Fletcher, Jr.
Attesting Officer

WILLIAM E. SCHUYLER, JR.
Commissioner of Patents